United States Patent [19]

Günther

[11] Patent Number: 4,817,145

[45] Date of Patent: Mar. 28, 1989

[54] GENERATOR FOR GENERATING BINARY CIPHERING SEQUENCES

[75] Inventor: Christoph-Georg Günther, Fislisbach, Switzerland

[73] Assignee: BBC Brown, Boveri & Company, Limited, Baden, Switzerland

[21] Appl. No.: 918,884

[22] Filed: Oct. 15, 1986

[30] Foreign Application Priority Data

Oct. 17, 1985 [CH] Switzerland .......................... 4482/85

[51] Int. Cl.$^4$ ............................................. H04L 9/02
[52] U.S. Cl. ....................................... 380/47; 380/46; 380/50
[58] Field of Search .......................... 364/717; 331/78; 380/44, 46-48, 50

[56] References Cited

U.S. PATENT DOCUMENTS

| | | | |
|---|---|---|---|
| 3,548,174 | 12/1970 | Knuth | 364/717 |
| 3,728,529 | 4/1973 | Kartchner et al. | 364/717 |
| 3,986,168 | 10/1976 | Anderson | 364/717 X |
| 4,115,657 | 0/0000 | Morgan | 380/46 |
| 4,161,041 | 7/1979 | Butler et al. | 364/717 |
| 4,202,051 | 5/1980 | Davida et al. | 380/50 |
| 4,375,620 | 3/1983 | Singer et al. | 364/717 X |
| 4,493,046 | 1/1985 | Watanabe | 364/717 |
| 4,673,871 | 6/1987 | Brown et al. | 364/717 X |

Primary Examiner—Stephen C. Buczinski
Assistant Examiner—Bernarr Earl Gregory
Attorney, Agent, or Firm—Oblon, Fisher, Spivak, McClelland & Maier

[57] ABSTRACT

A generator for generating ciphering sequences, including plural clocked subgenerators ($\Gamma$, $\psi$, $\Psi$) which, in turn, generate binary sequences at one or several outputs. To achieve high cryptographic security of the ciphering sequence ($\omega_t$) generated by the generator, n+1, at least three subgenerator are used in an arrangement in which the clock of n of these subgenerators ($\psi$, $\Psi$) is controlled in each case by at least one of the outputs of the (n+1)th subgenerator ($\Gamma$) either directly or via function generators ($\Delta f(t)$, $\Delta \bar{f}(t)$) wherein the sequences ($\mu f(t)$, $\mu \bar{f}(t)$) generated by the n sub generators are logically combined by at least one function, which function assumes both binary states with approximately the same frequency when its arguments pass through all possible values.

6 Claims, 2 Drawing Sheets

GENERATOR FOR GENERATING BINARY CIPHERING SEQUENCES

BACKGROUND OF THE INVENTION

Field of the Invention

This invention relates to a generator for generating binary ciphering sequences, such as is used, in particular, for coding binary-coded speech and binary messages and data.

DISCUSSION OF BACKGROUND

Binary sequences are frequently coded by mixing them with a "pseudo-random" ciphering sequence. By definition, these are generated by finite deterministic generators and are thus of necessity periodic. The generators themselves are designed in such a manner that some settings are freely selectable and can be used as a key. Current usage is that this key is the only secret element in such a generator. It is correspondingly desirable that different keys result in greatly differing ciphering sequences.

In the so-called "stream ciphering", a corresponding element of a binary ciphering sequence is modulo 2 added to each element of a binary sequence. In this simple method, it must be expected that the ciphering sequence generated with a given key is accessible to anybody. For this reason, it is essential that the law of formation of the sequence cannot be easily guessed. If the statistics of the ciphering sequence are not balanced, a part of the sequence carrying the message can also be reconstructed by statistical analyses. For this reason, the statistics of the ciphering sequence must be balanced, that is to say the statistics of the ciphering sequence must not differ significantly from a sequence produced by the ideal flipping of a coin.

A generator of the type initially mentioned was investigated in the following publications: W. G. Chambers and S. M. Jennings, "Linear equivalence of certain BRM shiftregister sequences", *Electronics Letters*, vol. 20, pp. 1018-1019, November 1984. K. Kjeldsen and E. Andresen, "Some randomness properties of cascaded sequences", *IEEE Trans. Inform. Theory*, vol. IT-26, pp. 227-232, March 1980. B. Smeets, "On the autocorrelation function of some sequences generated by clock controlled shift registers", *Proceedings of the Second Joint Swedish-Soviet Intern. Workshop on Inform. Theory*, pp. 130-136 (1985). R. Vogel, "Ueber die lineare Komplexität von kaskadenförmig verbundenen Folgen" (On the linear complexity of cascaded sequences), Preprint, March 1984.

In the text which follows, some variables are introduced which are important for the assessment of the generator characteristics. Together with the necessary conditions obtained for these variables, these are:

(1) Period: By period $T(\omega)$ of a sequence $\omega$, the minimum period of this sequence is meant, that is to say the smallest number T, so that $$\omega_{t+T} = \omega_t$$

$$\forall t \epsilon Z^+.$$

Condition: The period of a ciphering sequence must be long.

(2) Linear complexity: The linear complexity $L(\omega)$ of a sequence $\omega$ is the length of the shortest linear feedback-type shift register which generates the sequence $\omega$.

Comment: Knowledge of the sequence at $2L(\omega)$ successive times allows it to be completely determined by applying the so-called Massey algorithm.

Condition: The linear complexity of a ciphering sequence must be long.

(3) Frequency of short-length configurations: (Poker Test)

The frequency $\gamma_l(\omega,\{\sigma_i\})$ of the configuration $\{\sigma_i\}_0^{l-1}$ of the length l in $\omega$ is defined:

$$\gamma_l(\omega,\{\sigma_i\}) := \{t\epsilon\{0,\ldots,T(\omega)-1\}|\omega_{t+i}=\sigma_i, i\epsilon\{0,\ldots,l-1\}\}$$

Comment: The following holds true for a periodically contined sequence of statistically independent equally-distributed random variables:

$$\frac{\omega}{\gamma_l(\omega,\{\sigma_i\})} = \frac{1}{2^l}, \quad \{\sigma_i\} \epsilon (\{0,1\})^l, \quad l \leq T$$

In general, this cannot hold true for a ciphering sequence, for example only a single configuration of length T occurs apart from cyclic interchanges. For such a sequence, however, the statement can still hold true for $1 \leq l^*$ where $l^*$ is of the order of magnitude of $\log_2 T$. With this restriction, indeed, it must hold true since statistical analyses otherwise become possible.

Condition: For a ciphering sequence $\omega$, the following must hold true with a "sufficiently long" $l^*(\omega)$:

$$\left|\gamma_l(\omega,\{\sigma_i\}) - \frac{1}{2^l}\right| << \frac{1}{2^l}$$

$$\forall \{\sigma_i\} \epsilon (\{0,1\})^l, \forall l \leq l^*(\omega)$$

(4) 2-point autocorrelations:

The 2-point autocorrelation $C_\omega(\tau)$ of the sequence $\omega$ are defined by:

$$C_\omega(\tau) := \frac{1}{T} \sum_{t=0}^{T-1} (1 - 2\omega_t)(1 - 2\omega_{t+\tau})$$

They supply a measure of the degree of correspondence of a sequence with its cyclic permutations.

Condition: If $\tau$ is restricted to $0,\ldots,T-1$ the following must hold true for a ciphering sequence $\omega$ of period T for almost all $\tau$:

$$|C_\omega(\tau) - \delta_{\tau 0}| << 1$$

(5) 2-point cross-correlations between two sequences $\omega^{(1)}$ and $\omega^{(2)}$, which were generated with two different keys $S^{(1)}$ and $S^{(2)}$:

These variables are defined by $$K_{\omega^{(1)},\omega^{(2)}}(\tau) := \frac{1}{T} \sum_{t=0}^{T-1} (1 - 2\omega_t^{(1)})(1 - 2\omega_{t+\tau}^{(2)})$$

They form a measure of the key-dependence of the sequences generated.

Condition: If $\omega^{(1)}$ and $\omega^{(2)}$ are two ciphering sequences which were generated by a given generator with different keysetting $S^{(1)}$ and $S^{(2)}$, the following must hold true for almost all $\tau\epsilon\{0,\ldots,T-1\}$:

$|K_{\omega(1),\omega(2)}(\tau)| << 1$

In the known generator, the conditions mentioned at (1) and (2) are satisfied. In addition, the variables defined at (3) and (4) can be calculated in the known generator but the associated conditions are not satisfied.

SUMMARY OF THE INVENTION

Accordingly, one object of this invention is to provide a novel generator of the type initially mentioned in which not only the variables defined at (1) to (5) can be calculated but also all of the their associated conditions are satisfied.

The advantages achieved by the invention can be essentially seen in that, apart from the fact that the generator according to the invention has excellent characteristics in the sense of the conditions mentioned at (1) to (5), it can also be implemented by extremely simple means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
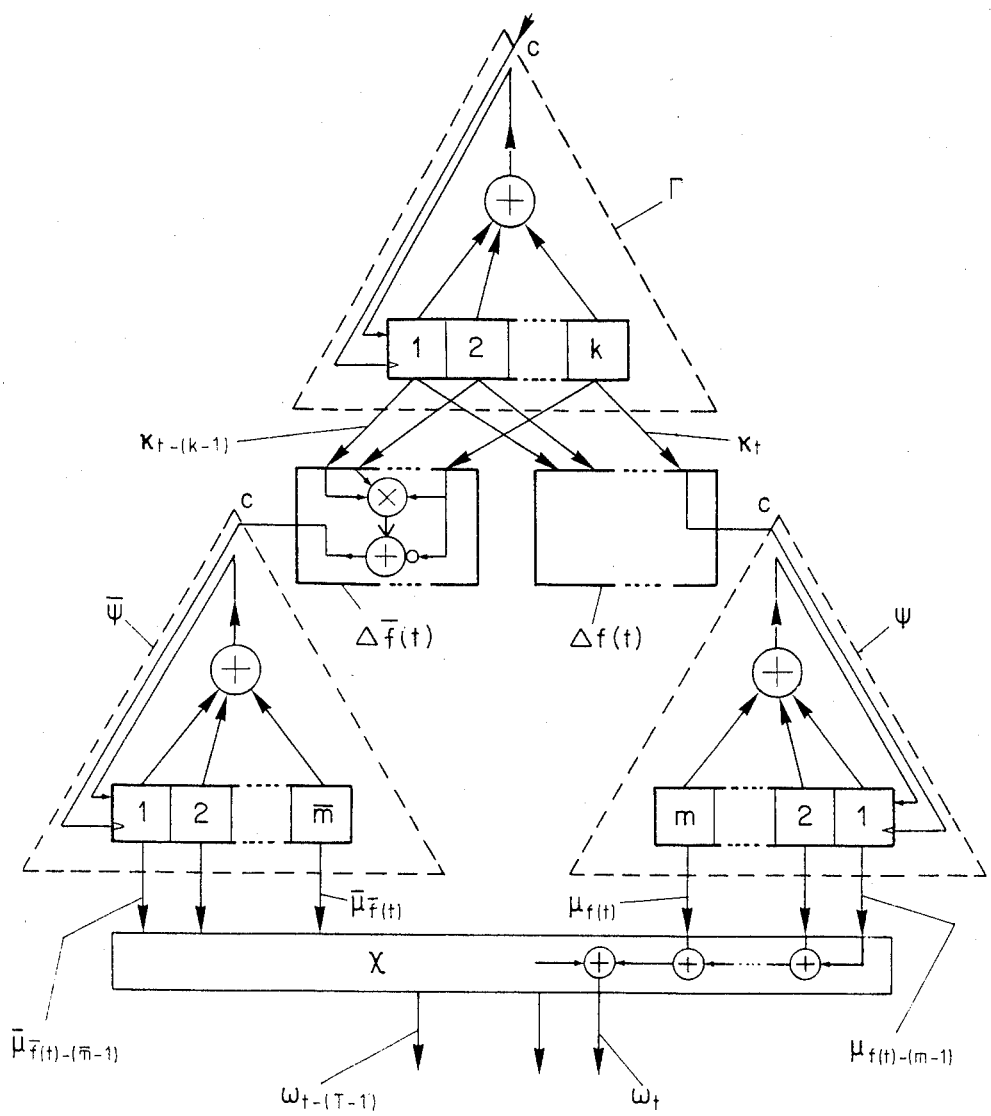
FIG. 1 is a schematic diagram of a generator which is constructed by using three subgenerators and FIG. 2 is a schematic diagram a generator which is obtained by generalizing the generator according to FIG. 1.

Referring now to the drawings, wherein like reference numerals designate identical or corresponding parts throughout the several views, and more particular to FIG. 1 thereof, the symbols $\Gamma$, $\psi$, and $\overline{\psi}$ in FIG. 1 designate three part-generators which are diagrammatically shown as dashed triangles and which generate binary sequences $\kappa$, $\mu$ and $\overline{\mu}$ having a period of k, M and $\overline{M}$.

The three subgenerators $\Gamma$, $\psi$ and $\Psi$ can be implemented for example, as shown in FIG. 1 within the dashed triangles, by linear feedback-type shift registers with a maximum period of $K = 2^k - 1$, $M = 2^m - 1$ and $\overline{M} = 2^{\overline{m}} - 1$ and a length of k, m and $\overline{m}$. In a linear feedback-type shift register, a part or all bits of the shift registers, added to each other, for example, modulo 2, are fed back to its input.

The subgenerators $\Gamma$, $\psi$ and $\overline{\psi}$ must be clocked and for this purpose have clock inputs c in each case. The subgenerators $\Gamma$ obtains its clock from an external clock generator, not shown in FIG. 1. The clocks of the two remaining subgenerators $\psi$ and $\overline{\psi}$ are derived from outputs of the subgenerators $\Gamma$ via funcction generators $\Delta f(t)$ and $\Delta \overline{f}(t)$. At these outputs, it should be possible to pick up the sequence $\kappa$ in each case, in a different time position (phase) at each output. With a length K of the period of the sequence $\kappa$, K of such different time positions $\kappa_t \ldots \kappa_t - (K-1)$ are basically possible. If the part generator $\Gamma$ is implemented as a linear feedback-type shift register, these K time positions can be implemented by suitable linear combination of only k successive outputs of the shift register. Correspondingly, only k outputs of the subgenerator $\Gamma$ are drawn in FIG. 1.

Sequences $\mu$ and $\overline{\mu}$ can also be generated by the subgenerators $\psi$ and $\overline{\Psi}$ to have different time positions. Corresponding to their period length, M and $\overline{M}$ of such time positions $\mu_{f(t)}, \ldots, \mu_{f(t)-(M-1)}$ and $\overline{\mu}_{f(t)}, \ldots, \overline{\mu}_{\overline{f}(t)-(\overline{M}_{M-1})}$ are possible. If the subgenerators $\psi$ and $\overline{\Psi}$ are implemented as linear feedback-type shift registers, the M and $\overline{M}$ different time positions can again be implemented by suitable linear combinations of only m and $\overline{m}$ successive outputs of the shift registers. For this reason, only m and $\overline{m}$ of such outputs are drawn in FIG. 1.

The functions f and $\overline{f}$ are defined by $$f(t): = \sum_{s=0}^{t-1} \Delta f(s)$$

$$\overline{f}(t): = \sum_{s=0}^{t-1} \Delta \overline{f}(s).$$

The sequences available at the outputs of power generators $\psi$ and $\Psi$ are logically combined, not necessarily all of them, via at least one logical combining unit $\chi$ to form the ciphering sequence $\omega^t$ which, under certain circumstances, should be available also at different time positions $\omega_t, \ldots, \omega_t - (T-1)$.

The combination of the elements described, that is the three subgenerators $\Gamma$, $\overline{\psi}$ and $\Psi$ the two function generators $\Delta f(t)$ and $\Delta \overline{f}(t)$ and the logical combining unit $\chi$ forms a generator according to the invention.

As shown in FIG. 1 within the rectangles representing the function generators $\Delta f(t)$ and $\Delta \overline{f}(t)$, the sequence $\kappa$, for example, can be forwarded by the function generator $\Delta f(t)$ to the clock input c of the part generator $\psi$ only at time position t whilst, for example, the complement of sequence $\kappa$ can be added by the function generator $\Delta \overline{f}(t)$ at time position t and modulo 2 to the product of sequence $\kappa$ at all time positions, that is to say can be carried modulo 2 added to subgenerator $\kappa_t - (K-1) \ldots \kappa_t - 1 \kappa_t$ to clock input c of the subgenerator $\psi$. The logical combining unit $\chi$ can cause specific time positions of the sequences $\mu$ and $\overline{\mu}$ generated by the subgenerators $\psi$ and $\Psi$ to be modulo 2 added which is also illustrated, for example, for the $\mu_{f(t)}, \ldots, \mu_{f(t) - (m-1)}$ in FIG. 1 within the rectangle forming the logical combining unit $\chi$.

Having the aforementioned special embodiments of the subgenerators $\Gamma$, $\psi$ and $\Psi$ of the function generators $\Delta f(t)$ and $\Delta \overline{f}(t)$ and of the logical combining unit $\chi$, the generator according to the invention displays the characteristics, explained below, with respect to the variables and conditions initially defined at (1) to (5):

Let:

$$f^{\Phi}(t): = \sum_{s=0}^{t-1} \Delta f(t) + \Phi \quad \text{(I)}$$

$$\overline{f}^{\Phi}(t): = \sum_{s=0}^{t-1} \Delta \overline{f}(t) + \Phi$$

where $$\Delta f(t) = \kappa_t, \quad \text{(II)}$$

$$\Delta \overline{f}(t) = (1 - \kappa_t + \delta_{t,t_o}^{(K)}),$$

$$\delta_{t,t_o}^{(K)} = \begin{cases} 1 & \text{if } t \equiv t_o \pmod{K} \\ 0 & \text{else} \end{cases}$$

($t_o$ has been selected for $\kappa$ $t_o = 1$),

-continued $$\Phi \in \{0, \ldots, M - 1\}$$

$$\overline{\Phi} \in \{0, \ldots, \overline{M} - 1\}$$

($\Phi$ and $\overline{\Phi}$ are keys which determine the phase between the part generators $\Gamma$ and $\psi$ in the one hand, and $\Gamma$ and $\Psi$ on the other hand), then $$\omega_t^{(S)} := \mu_{f\Phi(t)} \oplus \overline{\mu_{f\overline{\Phi}(t)}}$$

defines the ciphering sequence for key $S = (\Phi, \overline{\Phi})$.

In the case described above, that is to say if $\Gamma$, $\psi$, $\overline{\Psi}$ are linear feedback-type shift registers, the definition equations (I) and (II) for $$\overset{(-)}{F} := \overset{(-)}{f}\overset{\overset{(-)}{\Phi}}{(K-1)} - \overset{(-)}{f}\overset{\overset{(-)}{\Phi}}{(0)}$$

will result in the value $$\overset{(-)}{F} = \frac{K+1}{2} = 2^{k-1},$$

which, in particular, also implies that $$\overset{(-)}{M} \text{ and } \overset{(-)}{F}$$

do not have a common divisor. If $M$ and $\overline{M}$ also do not have a common divisor and furthermore $M$ is divided by $K$ and $\overline{M}$ is greater than $K$, the following holds for all keys $S$:

1. For the period $$T(\omega^S) = K \cdot M \cdot \overline{M}$$

2. For the linear complexity:

$$L(\omega^S) \geq m \cdot K$$

3a. For the relative frequency of "1":

$$\omega^S = \tfrac{1}{2}(1 - 1/M\overline{M})$$

3b. For the relative frequency of configurations having a length $1 \leq \min(k, m, \overline{m})$:

$$\left| \gamma_l(\omega^S, \{\sigma_i\}) - \frac{1}{2^l} \right| = \frac{1}{2^l}\left( 0\left(\frac{1}{K}\right) + 0\left(\left(\frac{3}{2}\right)^l \frac{1}{M}\right) + 0\left(\left(\frac{3}{2}\right)^l \frac{1}{\overline{M}}\right) + 0\left(2^l \frac{1}{M\overline{M}}\right) \right)$$

Here, as also below, $0( \ldots )$ is to be interpreted in such a manner that $X = 0 (1/N)$ means that $X \cdot N$ tends towards a constant in the limit $N \to \infty$ 4. For the 2-point autocorrelations: $\{\rho_{\sigma,i}^S\} \sigma \in \{0 \ldots M\overline{M}-1\}, i \in \{0,1\}$, so that the following holds true for all $$\tau = \rho + \sigma K \neq \rho_{\sigma,i}^S + \sigma K$$

$$|C_{\omega^S}(\tau)| = 0\left(\frac{1}{M}\right) + 0\left(\frac{1}{\overline{M}}\right)$$

5. For the 2-point cross-correlations between two sequences which are generated with two different keys $S^{(1)}$ and $S^{(2)}$:

$$\{\rho_{\sigma,i}^{S^{(1)},S^{(2)}}\} \sigma \in \{0, \ldots M\overline{M} - 1\}, i \in \{0,1\}, \text{ so that}$$

the following holds true for all $$\tau = \rho + \sigma K \neq \rho_{\sigma,i}^{S^{(1)},S^{(2)}} + \sigma K$$

$$|K_{\omega S(1), \omega S(2)}(\tau)| = 0\left(\frac{1}{M}\right) + 0\left(\frac{1}{\overline{M}}\right)$$

With these results, which guarantee excellent characteristics within the meaning of (1) to (5) for realistic selections of the parameters (for example $k = m = 127$, $\overline{m} = 255$), together with the extremely simple implementation, the structure described is predestined for cryptographic applications.

The subgenerators $\Gamma$, $\psi$ and $\overline{\Psi}$ of FIG. 1 may not necessarily be implemented by linear feedback-type shift registers. Any other types of implementations are also possible. As a subgenerator, a generator of the type described can also be used itself in the sense of being cascaded.

If $\kappa$, $\mu$, $\overline{\mu}$ are sequences having periods $K$, $M$, $\overline{M}$ which are generated by 3 arbitrary subgenerators $\Gamma$, $\psi$, $\overline{\Psi}$, $\Delta f$ and $\Delta \overline{f}$ are functions of $\kappa$ and $t$ which are $K$-periodic in $t$, and the sequence generated by the composite generator is given by $$\omega_t = \mu_{f(t)} \oplus \overline{\mu_{\overline{f}(t)}}$$

where $\overset{(-)}{f}(t)$ is defined by $$\overset{(-)}{f}(t) := \sum_{s=0}^{t-1} \Delta \overset{(-)}{f}(s)$$

characteristics corresponding to (1) to (5) can be proven using $(M, \overline{M}) = (M, F) = (\overline{M}, \overline{F}) = 1$ and specific other compatible assumptions.

Figure 2:
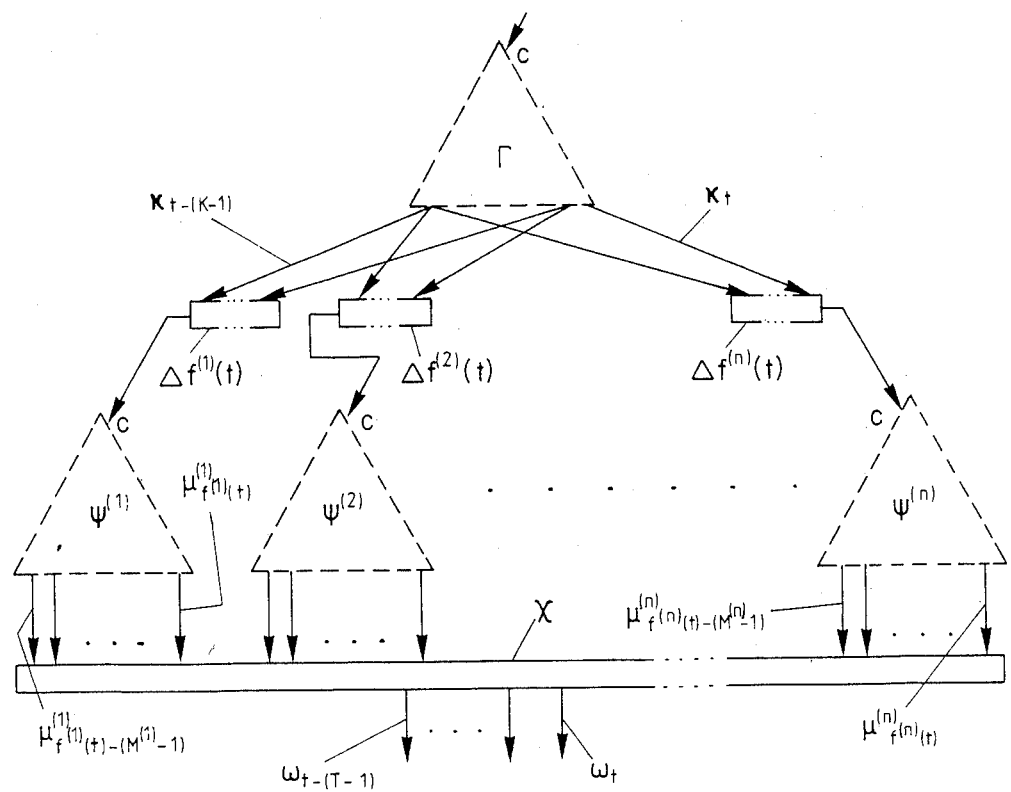

A generalization of the generator hitherto described and shown in FIG. 1 is also obtained by logically combining, instead of three arbitrary subgenerators, $n+1$ arbitrary subgenerators in a corresponding manner as shown in FIG. 2. That is to say, if $\kappa$, $\mu^{(1)}, \ldots, \mu^{(n)}$ are sequences of periods $K$, $M^{(1)}, \ldots, M^{(n)}$ which are generated by $n+1$ arbitrary part generators $\Gamma$, $\psi^{(1)}, \ldots, \psi^{(n)}$ and if $\Delta f^{(1)}, \ldots \Delta f^{(n)}$ are arbitrary $K$-periodic functions of $\kappa$ and $t$, the sequence generated by the composite generator is given by $$\omega_t = \bigoplus_{i=1}^{n} \mu_{f^{(i)}(t)}^{(i)}$$

where $f^{(i)}(t)$ has been defined by

-continued $$f^{(i)}(t) := \sum_{s=0}^{t-1} \Delta f^{(i)}(s)$$

Finally, the sequences $\psi$, $\overline{\Psi}$ or $\psi^{(1)}, \ldots \psi^{(n)}$ generated by the subgenerators $\mu$ and $\overline{\mu}$ or $\mu^{(1)}, \ldots \mu^{(n)}$ can be logically combined, instead of modulo-2 as assumed above by way of example, also by another function to form the ciphering sequence $\omega_t$ in the example of FIG. 1 and in the example of FIG. 2:

$$\omega_t = \chi(\mu^{(1)}_{f(1)(t)}, \ldots, \mu^{(n)}_{f(n)(t)}),$$

where $\chi$ is an arbitrary function which has itself been designated by using the same symbol as that of the logical combining unit itself.

This function has to satisfy the following relation $$\sum_{x \in (\{0,1\})^n} \chi(x(1),\ldots,x(n)) \sim 2n-1,$$

that is to say assume both binary states with the same frequency when its arguments pass through all possible values.

Obviously, numerous modifications and variations of the present invention are possible in light of the above teachings. It is therefore to be understood that within the scope of the appended claims, the invention may be practiced otherwise than as specifically described herein.

| List of designations | |
|---|---|
| $\Gamma, \psi, \Psi$ | Part generators |
| c | Clock inputs |
| $\Delta f(t), \Delta \bar{f}(t)$ | Function generators |
| $\kappa_t, \ldots, \kappa_{t-(k-1)}$ | Sequence generated by part generator $\Gamma$ at K different time positions |
| $\mu_{f(t)}, \ldots, \mu_{f(t)-(\overline{m}-1)}$ | Sequence generated by part generator at $\overline{m}$ different time positions |
| $\mu_{\bar{f}(t)}, \ldots, \mu_{\bar{f}(t)-(\overline{m}-1)}$ | Sequence generated by part generator at m different time positions |
| $\chi$ | Logical combining unit |
| $\omega_t, \ldots, \omega_{t-(T-1)}$ | Ciphering sequence at T different time positions |
| $\psi^{(1)}, \ldots, \psi^{(n)}$ | Part generators |
| $\Delta f^{(1)}(t), \ldots, \Delta f^{(n)}(t)$ | Function generators |
| $\kappa_t, \ldots, \kappa_{t-(K-1)}$ | Sequence generated by part generator $\Gamma$ at K different time positions |
| $\mu^{(1)}_{f(t)}, \ldots, \mu^{(1)}_{f(t)-(M^{(1)}-1)}$ | Sequences generated by part generators $\psi^{(1)}, \ldots, \psi^{(n)}$ at $M^{(1)}, \ldots, M^{(n)}$ different time positions respectively. |
| $\mu^{(n)}_{f(t)}, \ldots, \mu^{(n)}_{f(t)-(M^{(n)}-1)}$ | |

What is claimed as new and desired to be secured by Letters Patent of the United States is:

1. Generator for generating binary ciphering sequences, comprising:
    a first random generator generated binary pseudo random sequences at at least one data output, wherein said first random generator has a clock input being connected to an external clock generator and wherein applying a clocking signal to the clock input has the effect of producing a new binary state at the at least one data output of said first random generator;
    function generator means being provided at the at least one data output of said first random generator and performing predetermined logic operations on said data output;
    a pair of further random generators generating binary pseudo random sequences at at least one data output, wherein said further random generators in each case have a clock input and wherein applying a clocking signal to the clock input has in each case the effect of producing a new binary state at the at least one data output of said further random generators;
    wherein the clock input of each of said further random generators is connected to the output of one of said function generator means with the effect, that said further random generators in each case produce their new binary state at random times; and
    at least one combining unit for logically combining the binary states being available at random times at the data outputs of said further random generators, wherein said combining unit performs a predetermined logical combining function to form at least one ciphering sequence so that both binary states are assumed with approximately the same frequency when the arguments of said combining function pass through all possible values;
    wherein the sequence generated by said first random generator and the sequences generated by said further random generators fulfill the following relations:
    (a) the period k of the sequence generated by said first random generator divides one of the two periods M, $\overline{M}$ of the sequences generated by said pair of further random generators,
    (b) the sums over the binary values of the sequences generated by said pair of further random generators, taken over a period k of the sequence of said first random generator are defined by
    $\underline{F} = 2^e + p(M)$ and
    $\overline{F} = 2^{\bar{e}} + \bar{p}(\overline{M})$
    respectively, where e and $\bar{e}$ are positive integral numbers and p(M) and $\bar{p}(\overline{M})$ are arbitrary polynominals in M and $\overline{M}$.

2. Generator as claimed in claim 1, wherein said logical combining unit comprises:
    means for performing modulo 2 addition on at least two of the sequences available at the data output of the further random generators.

3. Generator as claimed in claims 1 or 2, wherein the periods M and $\overline{M}$ of the binary sequences generated by said pair of further random generators do not have a common divisor.

4. Generator as claimed in claim 3, wherein:
    one data output of the first random generator is connected immediately to the clock input of one of the pair of further random generators, and
    the complement of said one data output of the first random generator and the complement of at least one other data output of the first random generator are connected to function generator means for logically combining said complements as the clock input of the other of said pair of further random generators.

5. Generator as claimed in claim 4, wherein both M and F and $\overline{M}$ and $\overline{F}$ do not have a common divisor.

6. Generator as claimed in claim 1 wherein each of said further random generators comprises a linear feedback-type shift register.

* * * * *